United States Patent [19]

Dean

[11] Patent Number: 5,360,633
[45] Date of Patent: Nov. 1, 1994

[54] RICE HULL ASH

[75] Inventor: James Dean, Humble, Tex.

[73] Assignee: Uncle Ben's, Inc., Houston, Tex.

[21] Appl. No.: 4,527

[22] Filed: Jan. 14, 1993

[51] Int. Cl.$^5$ .............................................. B05D 7/00
[52] U.S. Cl. ................................. 427/220; 427/421; 428/403; 44/602; 106/244
[58] Field of Search ............... 427/220, 421; 428/403; 44/602; 106/244

[56] References Cited

U.S. PATENT DOCUMENTS

| | | | |
|---|---|---|---|
| 2,448,605 | 9/1948 | Kleinicke | 44/602 |
| 4,295,891 | 10/1981 | Daussan et al. | 501/99 |
| 4,555,448 | 11/1985 | Durham | 428/402 |
| 5,192,337 | 3/1993 | Wajer et al. | 44/602 |

*Primary Examiner*—Shrive Beck
*Assistant Examiner*—David M. Maiorana
*Attorney, Agent, or Firm*—Curtis, Morris & Safford

[57] ABSTRACT

The amount of small airborne particles of rice hull ash is minimized by treating the particles with a coating of vegetable oil and/or glyceride in and on the surface of the particles without filling the porous spaces within the rice hull ash particles.

10 Claims, 1 Drawing Sheet

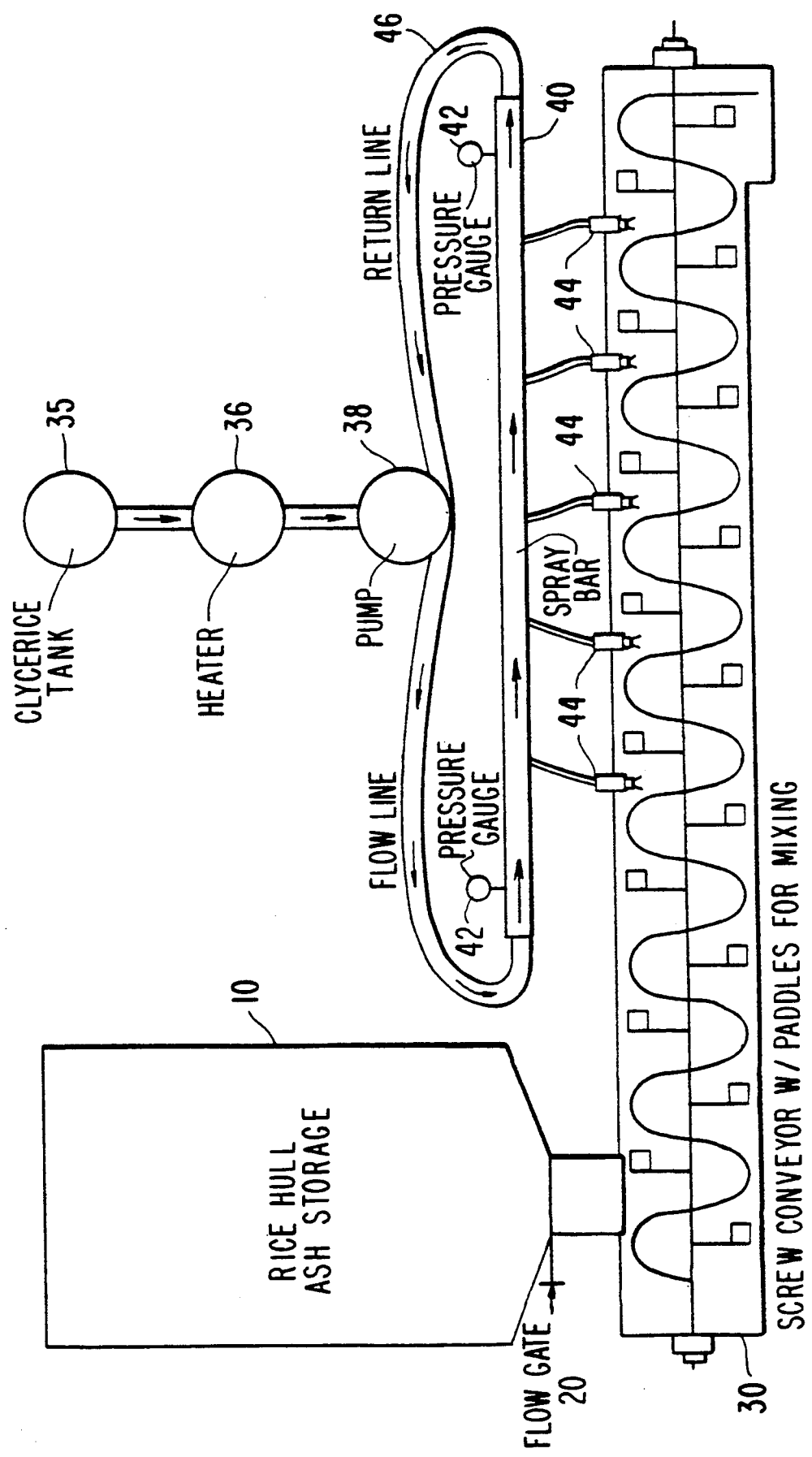

RICE HULL ASH

FIELD OF THE INVENTION

The present invention relates to treated rice hull ash and to processes for its preparation.

BACKGROUND OF THE INVENTION

Paddy rice harvested from the fields includes a hull surrounding the rice grain. Rice hulls are separated from the paddy rice, usually after the paddy rice has been subjected to processing operations.

There has been considerable effort to find beneficial and profitable uses for the hulls which may be considered as an inevitable product of all rice processing. Rice hulls are disposed of by returning them to the field, or using them in animal litter and in animal feed, or as a carrier and in plastics, and other assorted ways. One of the other major ways in which rice hulls are used is as fuel. To use the rice hulls as fuel, they are simply burned. The burned rice hulls produce an ash which is also used in many ways including in animal litter and in plastics. The ash is also used as a component of refractory material and as a very effective insulating material and to insulate molten steel.

In steel mills, rice hull ash is applied as an insulating covering over ladles of molten steel and tundishes while the molten steel is being held prior to further processing. The insulation effect afforded by this "blanket" of rice hull ash minimizes heat loss from the molten steel.

Use and treatment of rice hull ash has been an active topic in the patent literature. There have been numerous efforts to improve on the basic technology. For example, U.S. Pat. No. 4,442,130 teaches a method for processing rice which utilizes the hulls. In the method, rice hulls are fed into a burner unit where they are burned in two stages to produce ash and relatively clean hot gases. The hot gases are cycled for use in a heat treating phase of the rice.

Unfortunately, one especially undesirable condition persists. Rice hull ash includes small particles which become airborne. These airborne particles can be very irritating as they are essentially a black dust, and they get into the eyes and nose of anyone in the vicinity of the ash. Additionally, these black particles leave a dusty film.

OBJECTS OF THE INVENTION

Accordingly, it is an object of the invention to minimize the airborne particles of rice hull ash during processing and in related applications of the ash.

It is an additional object of the invention to provide a rice hull ash product which produces minimal airborne particles.

It is another object of the invention to provide a generally improved rice hull ash product.

It is still another object of the invention to provide a rice hull ash product, which is useful in many of the ways that rice hull ash has been conventionally used, but which minimizes dusting and other deleterious aspects of rice hull ash.

These and other objects of the invention will be readily apparent from the following description and claims.

SUMMARY OF THE INVENTION

In one aspect, the invention is in a method for minimizing airborne particles of rice hull ash comprising applying to the ash an amount of at least one vegetable oil, at least one glyceride, or a combination of at least one vegetable oil and at least one glyceride, sufficient to reduce airborne particles of the ash.

In another aspect, the invention is in a composition comprising rice hull ash particles and an amount of at least one vegetable oil, at least one glyceride, or a combination of at least one vegetable oil and at least one glyceride sufficient to reduce those ash particles which would become airborne.

As described, the vegetable oil and/or glyceride is added to rice hull ash particles to prevent small particles of the ash from becoming airborne when the rice hull ash is used. Additionally, the vegetable oil and/or glyceride is added to rice hull ash particles to reduce the amount of airborne particles exposed to the environment, to reduce the amount of airborne particles exposed to workers, and to reduce the amount of ash wasted by non-target applications where windy conditions exist and/or up-drafts occur.

BRIEF DESCRIPTION OF THE DRAWING

The drawing diagrammatically illustrates a preferred embodiment for preparing an improved rice hull ash product in accordance with the invention.

DESCRIPTION OF CERTAIN PREFERRED EMBODIMENTS

Rice hull ash contains amorphous silica, carbon and traces of minor elements. It is light and sandlike so that particles of the ash tend to blow around and irritate anyone in the vicinity of the ash. Additionally, the ash particles are black. When the particles are blown around, they leave a dark dusty layer on nearby surfaces.

The rice hull ash product of the invention, and the method of preparing it, on the other hand, relate to an improved rice hull ash product which can be used in many of the same ways that rice hull ash has been conventionally used, but with a substantial reduction in the amount of airborne particles which occur.

In accordance with the present invention, rice hull ash is treated with at least one vegetable oil and/or at least one glyceride. The oil and/or glyceride is applied to the rice hull ash in such a manner as to reduce or decrease the amount of particles of the ash which become airborne when the rice hull ash is subsequently used.

Specifically, when the rice hull ash is treated in accordance with the invention, the particles of the rice hull ash, which would normally become airborne, are bound together in such a manner so as not to become airborne. The rice hull ash is treated so that the particles of the ash are not compressed but are merely sufficiently coated so that each particle of the ash adheres to the other particles. In fact, the ash particles are treated so that the outsides of the particles are lightly coated, but the porous spaces which exist inside the rice ash particles are not filled in but remain uncoated by the vegetable oil and/or glyceride. Since the porous spaces inside the particles remain uncoated, the insulating and absorbing qualities of the ash are not substantially effected. One skilled in the art would readily determine the appropriate amount of oil and/or glyceride to use to treat the particles so that they are sufficiently coated on the exterior while maintaining the porous spaces within the particle in an uncoated condition.

The vegetable oil and/or glyceride is preferably misted onto the ash so that the rice hull ash particles are lightly coated on the exterior, not compressed, and, also, so that the porous spaces within the particles remain uncoated.

The vegetable oils and glycerides used in accordance with the invention may be natural or synthetic, they may be saturated or unsaturated, and they may be heated. Examples of suitable vegetable oils and glycerides include avocado oil, apricot oil, almond oil, anchovy oil, animal fat, babassu oil, butter oil, borneo oil, barley oil, canola oil, coconut oil, corn oil, cotton seed oil, coffee bean oil, citrus d'limonene, cod oil, caster oil, crambe oil, chinese tallow oil, candlenut oil, copra oil, cocoa butter, flax seed oil, fish oil, fish liver oil, grape seed oil, herring oil, hemp seed oil, kapok oil, linseed oil, lard, lime seed oil, menhaden oil, mustard seed oil, morning glory seed oil, mowrah fat, melon seed oil, malabar tallow, neat foot oil, oiticica oil, olive oil, oat oil, orange oil, perilla oil, poppyseed oil, palm kernel oil, pecan oil, palm fruit oil, peanut oil, phulwara oil, pumpkin seed oil, rubber seed oil, rape seed oil, rice oil, rice bran oil, rye oil, sardine oil, sorghum oil, safflower oil, sunflower oil, soybean oil, sesame seed oil, squash seed oil, tung oil, tall oil, tomato seed oil, tea seed oil, tobacco oil, tallow, thalictrum oil, ucuhaba oil, whale oil, walnut oil, wheat germ oil and wheat oil.

In one preferred embodiment of the invention as shown in the drawing, the rice hull ash particles flow from a rice hull ash storage bin 10 and proceed through a flow gate 20 onto a conveyor 30. Any appropriate type of conveyor can be used, but preferably a screw conveyor is used. The screw conveyor can have paddles, if desired, to separate or fluff up the ash particles if necessary. The vegetable oil and/or glyceride is fed from a tank 35 through an optional heater 36, for controlling viscosity, by a metering pump 38 and flow line 39 to a spray bar 40. Spray bar 40 includes pressure gauges 42 to monitor and control the flow of the vegetable oil and/or glyceride by the pump 38. Suitable control systems (not shown) and known in the art are also provided to effect metering of the pump 38 in response to sensed pressure from gauges 42.

Spray nozzles 44 are provided in communication with spray bar 40 to direct a fine mist of the vegetable oil and/or glyceride to the rice hull ash particles within conveyor 30. The ash particles within conveyor 30 are completely coated by a mist of vegetable oil and/or glyceride from the nozzles 44 in the spray bar. Vegetable oil and/or glyceride not sprayed into conveyor 30 is returned to pump 38 by return line 46.

By controlling the droplet size of the mist, the volume of vegetable oil and/or glyceride sprayed and the rate of spray, the particles are coated with a fine mist on the exterior surfaces only without coating the porous interior surfaces of the rice ash particles. The flow rate of the particles on the conveyor is determined in pounds per minute, and, as mentioned, a sufficient amount of vegetable oil and/or glyceride is sprayed onto the particles, so that they are lightly coated on the exterior surfaces, to match the flow rate on the conveyor.

It has been found that, on average, 0.016 to 0.018 pounds of vegetable oil and/or glyceride per pound of ash provides the beneficial result contemplated. In a typical batch, vegetable oil and/or glyceride, in the amount of 733.04 pounds, is applied to 44,100 pounds of rice hull ash to yield a 1.66213% mixture.

Process parameters to consider would be clear to those skilled in the art. However, typically considered are the nozzle flowrate from the spray bar, the nozzle pressure drop, the spray angle, the liquid specific gravity, the liquid viscosity at 100° F., the liquid surface tension and the estimated sauter mean diameter. Ranges for these parameters include a nozzle flowrate from the spray bar of about 0.020 gpm to 0.035 gpm; nozzle pressure drop of 20 psig to 60 psig; spray angle of 70° to 90°; liquid specific gravity of 0.80 to 0.95; liquid viscosity at 100° F. of 145 sus to 175 sus; liquid surface tension of 70 to 90; and estimated sauter mean diameter of 100 micrometers to 175 micrometers and nozzle exit diameter in the range of 0.020 in. to 0.0225 in. to yield appropriate mist droplet sizes.

Particular examples of preferable process parameters in accordance with the invention are as follows:

(a) Nozzle Flowrate from the spray bar: HC 2.5, gpm=0.0319
   Nozzle Pressure Drop: 20.0 psi
   Spray Angle Degrees: 70.0 Hollow Cone
   Liquid Specific Gravity: 0.92
   Liquid Viscosity @ 100° F.: 160 SUS
   Liquid Surface Tension: 70
   The estimated sauter mean diameter is 170.3 micrometers.

(b) Nozzle Flowrate from the spray bar: HC 1.25, gpm=0.0237
   Nozzle Pressure Drop: 40.0 psi
   Spray Angle Degree: 90.0 Hollow Cone
   Liquid Specific Gravity: 0.92
   Liquid Viscosity @ 100° F.: 160 SUS
   Liquid Surface Tension: 90.0
   The estimated sauter mean diameter is 104.1 micrometers.

(c) Nozzle Flowrate from the spray bar: HC 2.0, gpm=0.0319
   Nozzle Pressure Drop: 33.0 psi
   Spray Angle Degree: 90.0 Hollow Cone
   Liquid Specific Gravity: 0.92
   Liquid Viscosity @ 100° F.: 160 SUS
   Liquid Surface Tension: 90.0
   The estimated sauter mean diameter is 122.3 micrometers.

The present invention is further described and illustrated in the following example. It will be appreciated that this example is provided solely for illustrating the invention and not for the purpose of limitation. It will further be appreciated that variations and modifications to the product and process can be made by the skilled person without departing from the spirit or scope of the invention as defined in the appended claims.

EXAMPLE

Definitions: Heavier dust from a sample of rice hull ash is referred to in this example as coarse dust, and lighter dust from the sample is referred to as floatable dust. The floatable dust is most likely the nuisance dust associated with hazards in the work place as this dust can remain airborne for long periods of time.

Experiment: ASTM D-547 for Dustiness Index was modified for testing of rice hull ash. An apparatus was built which consisted of a plexiglas "chute". The chute was 1' square by 6' in height.

A top drawer of the chute held about one kilogram of rice hull ash. The ash was dropped vertically from the drawer inside the chute. Shutters closed within 4 seconds of dropping the rice hull ash, and then dust was collected on slides mounted 18" from the bottom of the chute and weighed at two separate time intervals.

The heavier dust (coarse dust) was collected from the time the shutters closed at the 4 second time interval until 30 seconds. The lighter dust (floatable dust) was collected from the 30 second time interval until 5 minutes. Each dust sample was then weighed and the dustiness index calculated according to the following equation:

Dustiness Index = 40 × (grams dust per kilogram ash)

This procedure was repeated two times per sample of rice hull ash, and the average index was reported with standard errors.

| Ash Weight | Coarse Dust | Floatable Dust | Index |
|---|---|---|---|
| Results of Untreated Rice Hull Ash Sample: | | | |
| 1000.7 gms | 5.225 gms | | 209 |
| | | 2.825 gms | 113 |
| 1002.6 gms | 5.539 gms | | 221 |
| | | 2.674 gms | 107 |
| Average Value of Dustiness Index (Coarse Dust): | | | 215 |
| Average Value of Dustiness Index (Floatable Dust): | | | 110 |
| Results of Rice Hull Ash Sample Treated with Soybean Oil in Accordance with the Invention: | | | |
| 1000.0 gms | 6.539 gms | | 262 |
| | | 1.391 gms | 56 |
| 1003.6 gms | 3.912 gms | | 156 |
| | | 1.805 gms | 72 |
| Average Value of Dustiness Index (Coarse Dust): | | | 209 |
| Average Value of Dustiness Index (Floatable Dust): | | | 64 |

Percent Reduction in Dustiness Index for Treated Rice Hull Ash

The Dustiness Index for floatable dust, which is the nuisance dust, was reduced from 110 on the untreated sample to 64 on the treated sample for an average reduction of 42 percent.

(The Dustiness Index for coarse dust was 215 on the untreated sample and 209 on the treated sample. There appeared to be no significant reduction in the amount of coarse dust present.)

The treatment process in accordance with the invention decreased significantly the amount of very light dust present in the bulk sample of rice hull ash. This type of dust would most likely be considered "nuisance" dust since it stays airborne for longer periods of time than heavier dust particles.

CONCLUSIONS

These results indicated that the treated rice hull ash dust contained 42 percent less "floatable" dust than non-treated rice hull ash.

The results showed a reduction in the dustiness index of floatable dust from 110 to 64 for treated rice hull ash dust. The dustiness index for coarse dust was reduced slightly, from 215 to 209.

In conclusion, the very light dust particles in treated rice hull ash were significantly reduced.

The terms and expressions which have been employed are used as terms of description and not of limitation, and there is no intention in the use of such terms or expressions of excluding any equivalents of the features shown and described as portions thereof, its being recognized that various modifications are possible within the scope of the invention.

I claim:

1. A method for minimizing airborne particles consisting essentially of rice hull ash comprising applying to said ash an amount of at least one vegetable oil, at least one glyceride, or a combination of at least one vegetable oil and at least one glyceride, sufficient to reduce airborne particles of said ash.

2. The method as defined in claim 1, wherein the vegetable oil, glyceride or both is applied by spray.

3. The method as defined in claim 1, wherein 0.016 to 0.018 pounds of vegetable oil, glyceride or both is applied to one pound of ash.

4. The method as defined in claim 1, wherein the vegetable oil and glyceride is selected from the group consisting of avocado oil, apricot oil, almond oil, anchovy oil, animal fat, babassu oil, butter oil, borneo oil, barley oil, canola oil, coconut oil, corn oil, cotton seed oil, coffee bean oil, citrus d'limonene, cod oil, caster oil, crambe oil, chinese tallow oil, candlenut oil, copra oil, cocoa butter, flax seed oil, fish oil, fish liver oil, grape seed oil, herring oil, hemp seed oil, kapok oil, linseed oil, lard, lime seed oil, menhaden oil, mustard seed oil, morning glory seed oil, mowrah fat, melon seed oil, malabar tallow, neat foot oil, oiticica oil, olive oil, oat oil, orange oil, perilla oil, poppyseed oil, palm kernel oil, pecan oil, palm fruit oil, peanut oil, phulwara oil, pumpkin seed oil, rubber seed oil, rape seed oil, rice oil, rice bran oil, rye oil, sardine oil, sorghum oil, safflower oil, sunflower oil, soybean oil, sesame seed oil, squash seed oil, tung oil, tall oil, tomato seed oil, tea seed oil, tobacco oil, tallow, thalictrum oil, ucuhaba oil, whale oil, walnut oil, wheat germ oil and wheat oil.

5. The method of claims 2, 3 or 4 wherein said oil and/or glyceride is sprayed to coat said rice hull ash but not to fill porous spaces within said rice hull ash.

6. A composition consisting essentially of rice hull ash particles and an amount of at least one vegetable oil, at least one glyceride, or a combination of at least one vegetable oil and at least one glyceride sufficient to reduce those ash particles which would become airborne.

7. The composition as defined in claim 6, wherein the vegetable oil, glyceride or both is a coating on said ash particles.

8. The composition as defined in claim 6, wherein 0.016 to 0.018 pounds of vegetable oil, glyceride or both are applied per pound of ash particles.

9. The composition as defined in claim 6, wherein the vegetable oil and glyceride is selected from the group consisting of avocado oil, apricot oil, almond oil, anchovy oil, animal fat, babassu oil, butter oil, borneo oil, barley oil, canola oil, coconut oil, corn oil, cotton seed oil, coffee bean oil, citrus d'limonene, cod oil, caster oil, crambe oil, chinese tallow oil, candlenut oil, copra oil, cocoa butter, flax seed oil, fish oil, fish liver oil, grape seed oil, herring oil, hemp seed oil, kapok oil, linseed oil, lard, lime seed oil, menhaden oil, mustard seed oil, morning glory seed oil, mowrah fat, melon seed oil, malabar tallow, neat foot oil, oiticica oil, olive oil, oat oil, orange oil, perilla oil, poppyseed oil, palm kernel oil, pecan oil, palm fruit oil, peanut oil, phulwara oil, pumpkin seed oil, rubber seed oil, rape seed oil, rice oil, rice bran oil, rye oil, sardine oil, sorghum oil, safflower oil, sunflower oil, soybean oil, sesame seed oil, squash seed oil, tung oil, tall oil, tomato seed oil, tea seed oil, tobacco oil, tallow, thalictrum oil, ucuhaba oil, whale oil, walnut oil, wheat germ oil and wheat oil.

10. The composition as defined in claims 7, 8 or 9 wherein the rice hull ash particles are coated with said oil and/or glyceride without oil and/or glyceride filling porous spaces within said rice hull ash.

* * * * *